(12) United States Patent
DeClerck

(10) Patent No.: US 8,165,425 B2
(45) Date of Patent: Apr. 24, 2012

(54) INTERACTIVE MANUAL DEFORMABLE REGISTRATION OF IMAGES

(75) Inventor: Jerome DeClerck, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 943 days.

(21) Appl. No.: 12/179,224

(22) Filed: Jul. 24, 2008

(65) Prior Publication Data

US 2010/0021082 A1  Jan. 28, 2010

(51) Int. Cl.
*G06K 9/32* (2006.01)

(52) U.S. Cl. ........ 382/294; 382/128; 382/276; 382/293; 345/672; 345/676; 345/677; 345/678; 345/680

(58) Field of Classification Search ........................ None
See application file for complete search history.

(56) References Cited

U.S. PATENT DOCUMENTS

| | | | | |
|---|---|---|---|---|
| 6,121,979 A | * | 9/2000 | Carver | 345/681 |
| 6,266,453 B1 | * | 7/2001 | Hibbard et al. | 382/294 |
| 6,757,423 B1 | * | 6/2004 | Amini | 382/154 |
| 2002/0012478 A1 | * | 1/2002 | Thirion et al. | 382/294 |
| 2004/0156556 A1 | | 8/2004 | Lopez | |
| 2004/0249270 A1 | * | 12/2004 | Kondo et al. | 600/425 |
| 2005/0249434 A1 | | 11/2005 | Xu et al. | |

FOREIGN PATENT DOCUMENTS

WO  WO 02/089069 A2  11/2002

OTHER PUBLICATIONS

UK Search Report dated Jul. 31, 2007.

\* cited by examiner

*Primary Examiner* — Sath V Perungavoor
*Assistant Examiner* — Jason Heidemann
(74) *Attorney, Agent, or Firm* — Crowell & Moring LLP

(57) ABSTRACT

An image processing method is described that allows a user to deform an overlay image for the purpose of registration with a source image. The user defines a stretch vector for example by 'clicking and dragging' a mouse pointer and an algorithm deforms the overlay image according to a linear interpolated roll-off function.

14 Claims, 3 Drawing Sheets

REGISTRATION TRANSFORMATION (a) SOURCE IMAGE (b) TARGET IMAGE (c) SOURCE WITH TARGET OVERLAY (a)

(b)

(c)

(d)

(a) SOURCE IMAGE (b) TARGET IMAGE (c) SOURCE WITH TARGET OVERLAY

INTERACTIVE MANUAL DEFORMABLE REGISTRATION OF IMAGES

The present invention is concerned with processing of images such as those obtained by medical scanning procedures.

Image fusion is a key technology in medical imaging. Through fusion, radiologists may incorporate functional data like Positron Emission Tomography (PET) or Single Photon Computed Emission Tomography (SPECT) into their clinical practice and oncologists are able to more precisely locate disease.

Wherever two images are acquired showing a single patient and pathology, there is a strong indication for the use of fusion.

Fusion is a process which aims to co-register and then visualize images which carry different qualities of information. Imaging modalities such as X-ray Computed Tomography (CT), Magnetic Resonance Imaging (MRI), SPECT or PET, will display different properties of the imaged patient. Sometimes these are functional properties such as blood flow or metabolic rate; sometimes they are anatomical structures such as bones or organs. Fusion enables the physician to combine two different modality or time point and then to visualize and analyse the information contained in both images simultaneously, and in a unified anatomical space.

The key technology behind fusion is image registration: the ability to align two images taken from two complimentary image modalities and, or different time points. Numerous algorithms have been developed that are able to effect the registration of images automatically, see for example J. B. A Maintz and M. A. Viergever; "A Survey of Medical Image Registration"; *Medical Image Analysis*, 2(1): 1-36, 1998. These algorithms are implemented efficiently in research and commercial software.

Although automation of the registration saves time for the user, it is still necessary for the user to spend some time correcting the registration where this has not been performed satisfactorily. The interface can bring feedback to the user on how the registration progresses (see for example U.S. Pat. No. 6,266,453) or the correction of the alignment of the images can be done with manual interfaces.

When registration is rigid-body (translation, rotation) the user interface for correction is easy to implement as rotation and translation of objects can be assigned to specific motion of, say, a computer mouse. When the registration is deformable (i.e. the images are allowed to deform to improve the geometric alignment when the represented shapes are slightly different), the assignment of such motions is much more difficult to perform.

The present invention deals with the use of simple interactive tools such as a computer mouse to drive local deformable deformation to correct deformable registration. The same invention can be applied to segmentation of regions of interest using masks. The technique can be applied to two-dimensional (2D) or 3D image data, or even 4D data where the fourth dimension is time in a dynamic sequence of images.

Interfaces to apply linear transformations to images already exist and a number are implemented in commercial or academic software. An example is illustrated in FIG. 1: in that example, a PET image is linearly transformed (translated, rotated, scaled and sheared) using simple controls overlaid on the image. The figure shows the image and the transformation is illustrated using a displacement grid for clarity. The control object is a circle and a square which allow the user to:

rotate the image (b) by grabbing the green circle and rotating it like a steering wheel;

scale the image (c) by dragging the corners of the square and shear the image (d) by dragging the sides of the square.

This control object is one example implemented in a commercial software, but other systems may be implemented differently in other software. The important point is that simple mouse actions can correct the alignment in an interactive way that is sufficiently intuitive to the user.

To the applicant's knowledge, there is no tool which enables such interactive correction of deformable (non linear) registration in a satisfactory way. The classic interface which is provided in existing software tools is by providing to the user the ability to place corresponding landmark points in both images and to apply a deformation field which will best fit through the deformed points (FIG. 2).

One of the issues with the landmark system is that placement of the landmarks is often complicated as many landmarks need to be placed at crucial locations for the system to work. Such systems have not proven effective to most users and it is not utilised often by clinicians.

Such systems also exist for linear registration, but they are not used for the same reason: it is very hard to correct the location of a landmark once it has been placed on the image.

In another application, (image segmentation), some software tools enable the user to deform shape in an interactive fashion (see for example G. Shechter, J. M. Declerck, C. Ozturk and E. R. McVeigh "Fast template based segmentation of cine cardiac MR"; *Proceedings of the 7$^{th}$ Scientific Meeting of the International Society for Magnetic Resonance in Medicine*, Philadelphia, Pa. May 1999. In such cases, the manipulation of Regions of Interest (ROIs) represented by contours (in 2D) or meshes (3D) by dragging control points is one of the main ways of changing the shape. The method works well, but only allows local deformation of shapes rather than deformation of an entire image, as necessary for image registration.

Also in the domain of image segmentation, United Kingdom patent application number 0610757.7 describes a system in which displacement is defined on a voxel by voxel basis using "arrows" which are defined in the source voxel space and follow a roll off function. The advantage of the present invention is that a proper transformation is defined which can be subsequently edited. The method of the above patent application does not allow one easily to keep track of the exact deformation that the region of interest undergoes.

Moreover, the method of GB 0610757.7 defines the transformation of the ROI in a binary form (the pixel either is, or is not, in the stretched ROI). In the present invention, definition of the transformation using a displacement field allows interpolation of the displacement at each voxel, allowing overlaying images with shades of grey, rather than defining an overlay which would be specified in binary form.

According to the invention, a method of deforming an overlay image for registration with a source image comprises the steps set out in claim 1 appended hereto.

The invention will now be described, by non-limiting example, with reference to the following figures in which.

Figure 1:
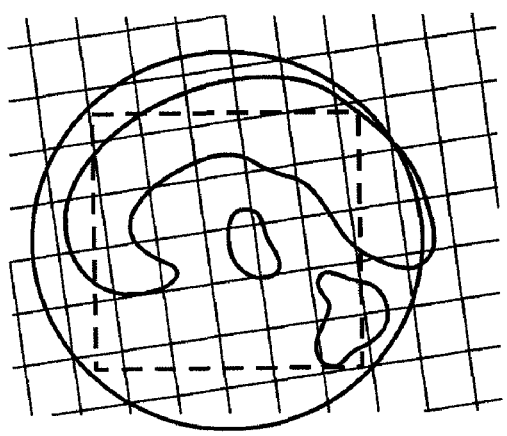
FIG. 1 shows an example from the prior art of a manual deformable interface which allows translation, rotation, scaling and shearing by clicking and dragging elements of a shape.
Figure 1:
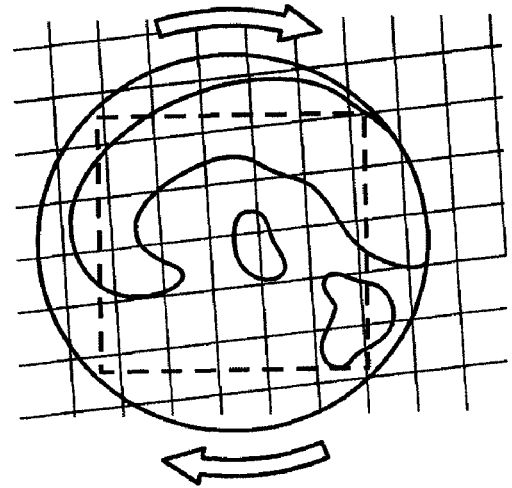
Figure 1:
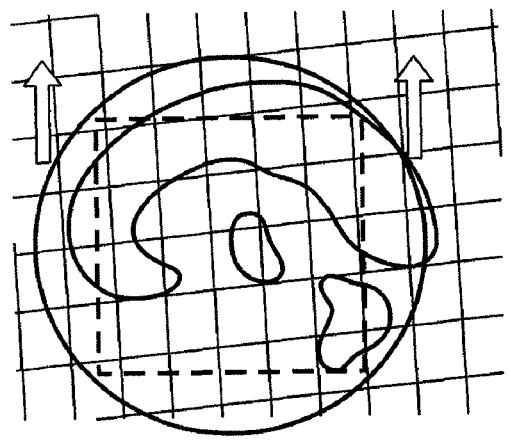
Figure 1:
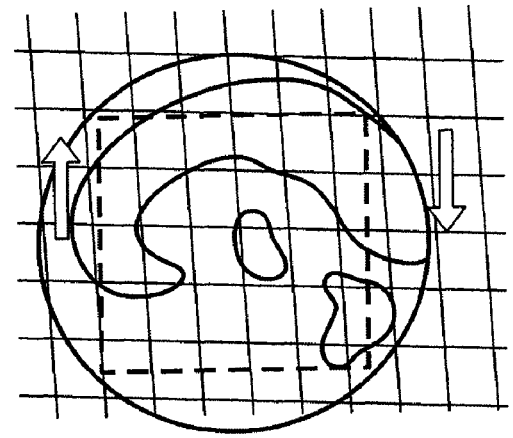
Figure 2:
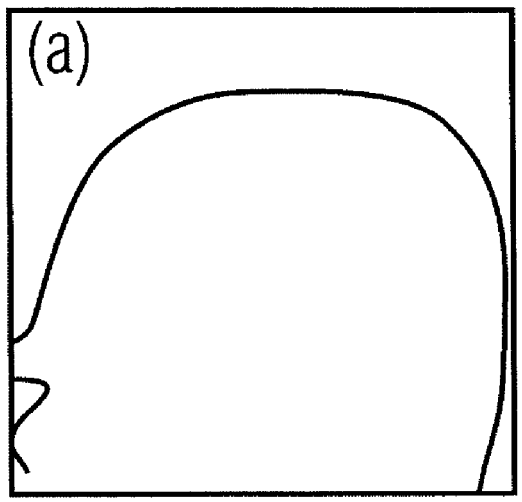
FIG. 2 illustrates the use of a landmark registration system to align MR and PET images of the head of a patient.
Figure 2:
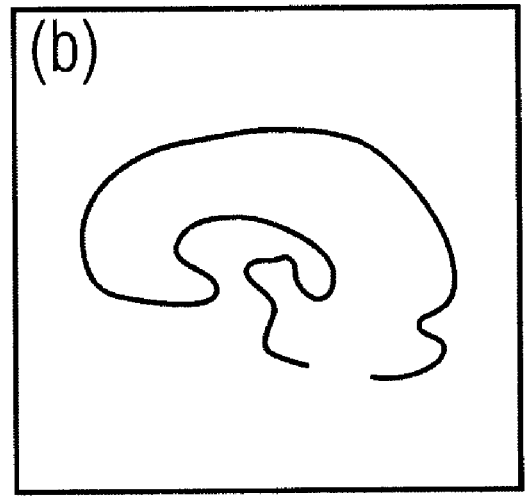
Figure 2:
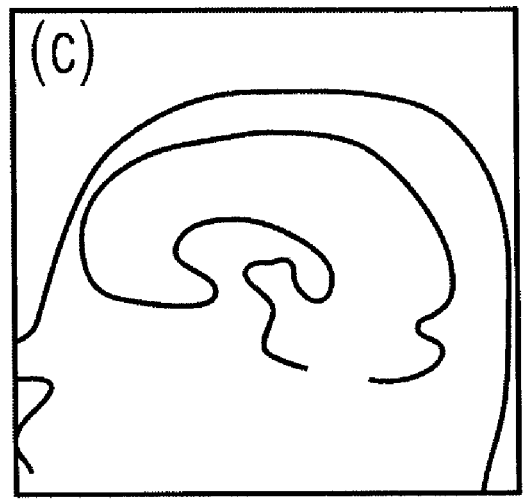
Figure 2:
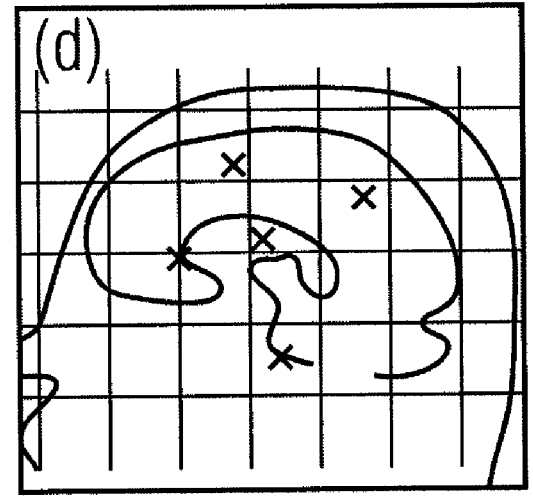
Figure 2:
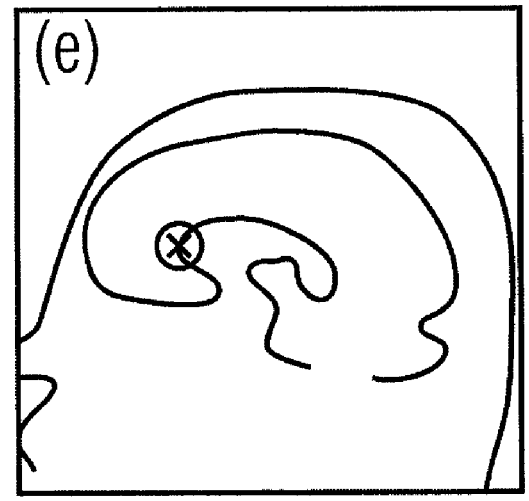
Figure 2:
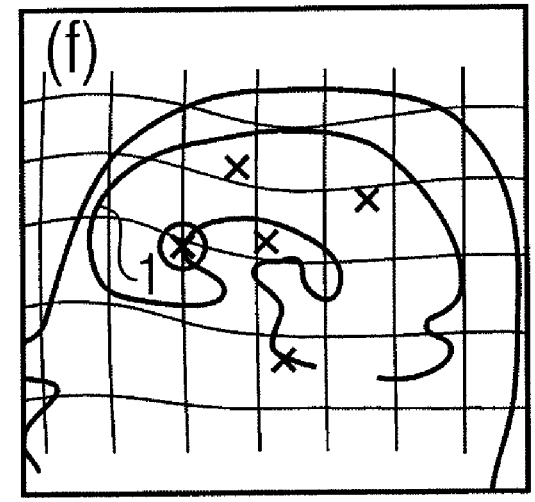

Referring to FIG. 2, (a) shows an MR image of the head of a patient and (b) shows a PET image of the same object. (c) shows the fused view of images (a) and (b). (d) has a grid representing the displacement overlaid along with landmarks (crosses) and (e) shows the fused view after one of the landmarks (circled on (f)) has been moved. The effect of moving the landmark on the displacement grid is shown at (f): note that the point of maximal displacement (1) does not occur where the user moved the landmark due to extrapolation of the parametric transformation model.

The essential purpose of the invention is for the user to be able to select a point at which to start dragging the image and then to stretch the image as required, in any direction (including, possibly, out of the current plane). Points that are further away from the selected start point will be moved less than those nearer to it; points that are beyond a certain distance away will not be moved at all. (This distance is a parameter of the algorithm).

Figure 3:
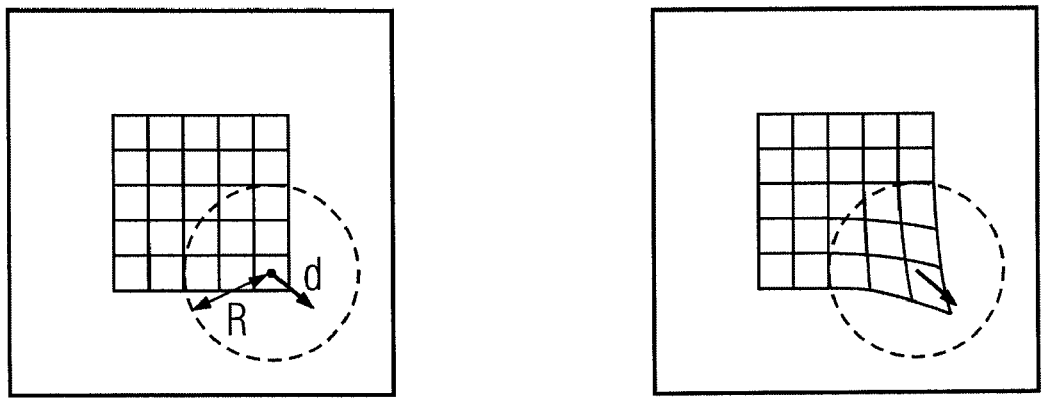
FIG. 3 illustrates (in 2D for clarity) the deformation of an image according to the invention and FIG. 4 illustrates the mathematical transformation necessary in order to calculate an overlay on a source image.

For example, referring to FIG. 3 (left) the user clicked at a point, dragged the mouse and released the mouse button at another location: the vector linking the point where the user clicked and the point where the user released is called d. This vector is the reference displacement that the user wants to impose locally to the image. It is known that all voxels within a circle (or, in 3D, a sphere) of a certain radius R will be affected. In one embodiment, this radius is a parameter of the algorithm but in others, the algorithm would facilitate input by the user of a value for R. The non-linear transformation is modelled as a linear interpolated displacement field. All nodes of the vectors at the nodes of the existing displacement field transformation are modified by composing the existing displacement with a new displacement field defined such that:
the displacement at each node is parallel to the direction of d;
the amplitude of the movement from each node is proportional to the modulus of d and follows a roll-off which is a function of the distance x between the point where the user clicked and the node of the displacement field.

Pixels (or voxels in 3D) at the outer extreme of the circle (sphere) defined by R will not move very far due to the effects of the roll-off far from the centre As an alternative to composition of the displacement fields, a good approximation can be obtained by adding the displacement vectors if one of the displacement fields is small in amplitude (i.e. by adding the values of the respective fields at corresponding nodes). Nevertheless, composition is the mathematically correct procedure.

Recall that with the landmark system, the maximal displacement occurred in a location that could be quite remote from the manually placed landmark points (see FIG. 2). This is due to the nature of the transformation which implicitly imposes smoothness of the displacement. The advantage of the present invention is that the maximum displacement will be exactly where the user has clicked, which provides visually much more intuitive results and facilitates subsequent corrections of the registration more easily than with landmarks.

Figure 4:
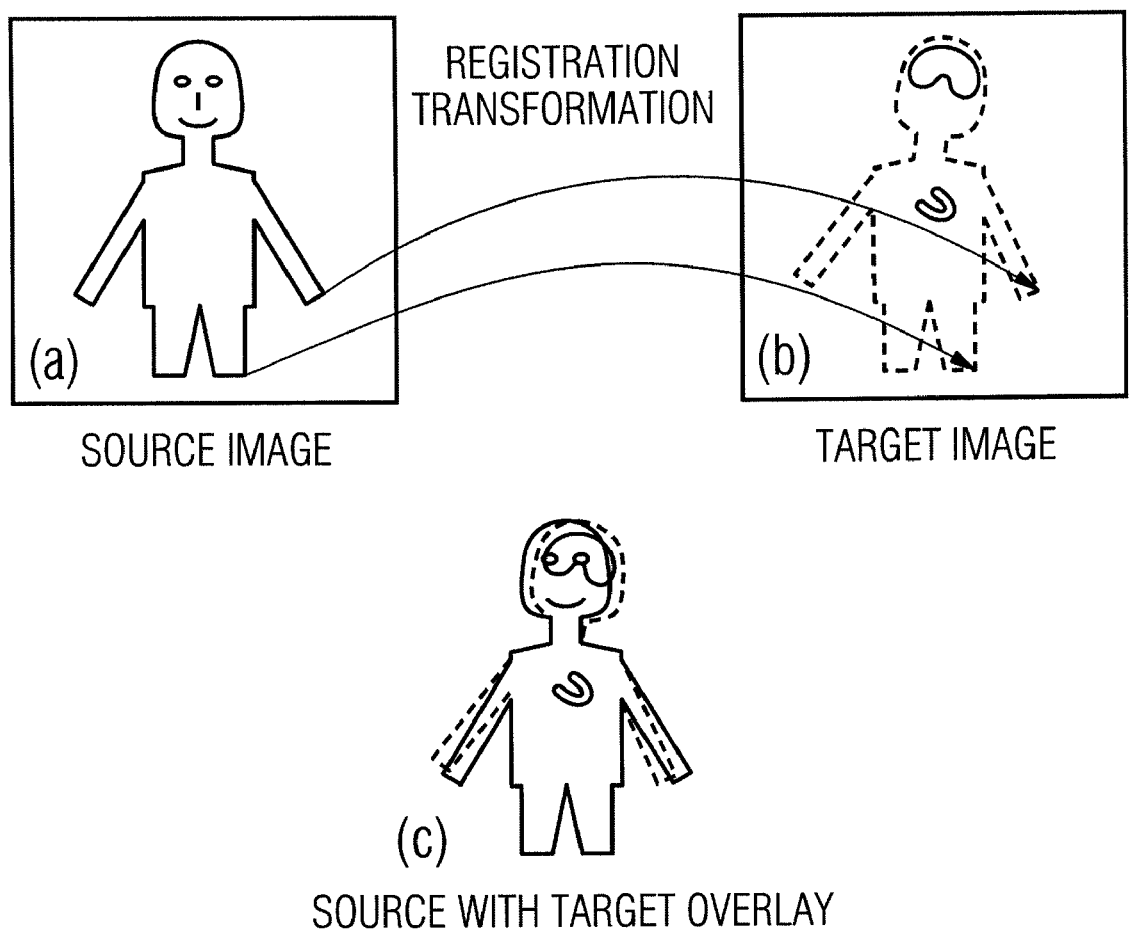

Referring to FIG. 4, in order to produce an overlay of a (e.g.) PET image (b) on a source such as a (e.g.) MRI image (a), the necessary registration transformation is defined from (a) to (b), i.e. (b) is the target. The transformation is defined from the source space to the target space: it enables to overlay the target image on top of the source image. The procedure for computing the overlay requires the computation of the transformed image in source space, filling each voxel of the image in source space with intensity values taken from the target image.

When deforming the overlay, the user always define the wanted displacement in the display which shows the source image with the target image as overlay. Hence, in order to calculate the displacement field to generate a displacement d of the overlay at the point where the user clicked, it is necessary to calculate an inverse displacement field based on −d as the displacement imprinted on the overlay is a displacement operated in the space of the target image, overlay which is the target space of the registration transformation.

As the displacement d is defined in source space, a field that produces the inverse displacement −d should be calculated. Equivalently, a displacement field generating a rolled off displacement d could be computed in target space and then inverted to create a displacement field in source space before composing with the existing displacement field.

In the remainder of this description, we consider the definition of the displacement that generates a displacement d where the user clicks. The issue of whether to invert that displacement field defined in target space, or to create a displacement field that generates a displacement of −d directly in source space will not be discussed further as it does not impact significantly on the invention. As inversion of a whole displacement field can take some time, the method which creates the displacement −d directly in source space will be preferred anyway.

The following properties define the term "roll-off function", g, as used in describing the current invention:
the function has a value of one at the centre to ensure that the point the user dragged moves exactly as specified:

$g(0)=1$ the function has a value of zero (or near zero) at the edge of the region affected to allow for continuous transition between those voxels that move and those that don't:

$g(x)=0$ if $x \leq -R$ and if $x \geq R$ (recall that $R$ is a parameter of the algorithm).

the function is monotonic for each half, in each dimension independently (increasing in the left half, decreasing in the right half) to ensure that the deformation varies monotonically between those points at the edge that do not move, and those in the centre that move the furthest:

$g'(x)>0$ if $-R<x<0$ $g'(x)<0$ if $0<x<-R$ g' is the first derivative of g with respect to distance from the origin of −d the function is continuous, to ensure smooth, continuous deformations.

These properties are mathematical translations of a definition of a function which has a large value in its centre and decreases continuously with from the centre. The function could be 'strictly decreasing' i.e. the value is always reduced as the distance from the centre is increased, or it could be 'non-strictly' decreasing, for example having a constant value along a certain distance.

Variations are acceptable, depending on the desired final result. For instance, in addition to the above, the following properties, whilst not strictly required, lead to a visually more pleasing result:
zero (or negligible) derivative on the boundary, to ensure that the roll-off smoothly transitions between voxels that move, and those that don't $g'(-R) \approx 0, g'(R) \approx 0$ zero derivative in the centre (where the stretch originates from) to ensure that points local to this position are effectively translated by the stretching operation $$g'(0)=0$$

smoothness (continuous function, derivative and ideally second derivative, although that the latter is not vital) to lead to a smoothly transformed ROI One such function that satisfies these properties is a Gaussian or truncated 3D Gaussian, but other functions such as B-splines could also be used.

Constraints to ensure that the transformation is invertible may be applied as well as to ensure that there is no 'tear' in the image. These constraints can be imposed in a number of ways:

1. Constraints can be imposed directly on the roll-off function by ensuring that the function $x+\|d\|.g(x/R)$ has non-negative derivative (with respect to the distance x from the origin of where the user clicked) over the interval $[-R;R]$. This naturally imposes a constraint tying $\|d\|$ and R. One way to implement this tie is by choosing R such that the generated displacement is always invertible ($R>\|d\|.max|g'|$).
2. Alternatively, if d is large, (such that $\|d\|>R/max|g'|$), the stretch could be divided into smaller displacements. For example, N displacements of vector d/N could be composed as if the user clicks N times in the same direction. In such a case, N is chosen such that the displacement field generated by d/N is invertible ($N>\|d\|.max|g'|/R$) and that displacement field composed N times with the original displacement field.

Approaches 1 and 2 above create a displacement that is invertible ($x+\|d\|.g(x/R)$ has non-negative derivatives). This may not be sufficient for visually pleasing results and this constraint could be replaced with a constraint that the derivative of $x+\|d\|.g(x/R)$ is greater than a, where a is an arbitrary strictly positive value between 0 and 1, in which case, the constraints above are modified as follows:
1. becomes $R>\|d\|.max|g'|/(1-a)$, and
2. becomes $N>\|d\|.max|g'|/[R*(1-a)]$.

Finally, a more sophisticated roll-off function could be used that does not depend only on the distance between the points where the user clicked and where the user released the mouse button. Rather, a true 3D function is used such that the divergence of the displacement field g is zero.

$$\nabla g = \frac{\partial g_x}{\partial x} + \frac{\partial g_y}{\partial y} + \frac{\partial g_z}{\partial z} = 0$$

This is equivalent to saying that a shape deformed by the displacement field generated by g will not have its volume modified after deformation: the transformation is incompressible. By dividing the displacement into N chunks, the composition of incompressible displacements is still an incompressible transformation, so there is no limit on the amplitude of the imposed stretch. However, it is expected that, due to interpolation errors in the displacement field, that the resulting divergence of the total displacement will not be exactly zero, but a small enough number to be acceptable. If necessary, N or $\|d\|$ can be defined to prevent such situations.

The implementation of the 3D composition of transformations can be expensive and could cause unacceptable delays in the interaction. To prevent this, the displacement field resolution can be reduced or the displacement field could be implemented in the 2D slice (for display purposes only) while the user moves the mouse (composition of N displacements in 2D should be close to real time even if N is large (e.g. around 10)) and the displacement is computed in 3D only when the mouse is released.

This will enable faster interaction and the time when the user releases the mouse (i.e. not performing any action) is used to do the heavy computing, thereby optimising the interface.

The invention claimed is:

1. A method of deforming an overlay image for registration with a source image, said method comprising the steps of:
   (i) defining a vector d in the source image
   (ii) determining the inverse vector −d;
   (iii) calculating a linear interpolated displacement field whereby each point is displaced in a direction parallel with −d by a distance determined by a roll-off function, g, said function having a value that decreases continuously with distance in any direction, from a value of one at the origin of −d, to a value of substantially zero at some point at a distance R to the origin of where the displacement d is defined, and
   (iv) applying the linear interpolated displacement field to recalculate the overlay image.

2. A method according to claim 1, further including the steps of:
   defining a vector D in the source image;
   defining a set of vectors d1, d2, . . . , dn such that $$\sum_{i=1}^{n} d_i = D, n \geq 1,$$

and
   repeating steps (ii) to (iv) for each of d1, d2, . . . , dn.

3. A method according to claim 2, where the overlay is recalculated n times, applying a linear interpolated displacement field calculated from one of
   d1, d2, . . . , dn each time.

4. A method according to claim 2, where the overlay is recalculated by combining the linear interpolated displacement fields calculated from each of
   d1, d2, . . . , dn and applying the resultant combination to the overlay.

5. A method according to claim 4, where at least one of the combining the displacement fields and the recalculation of the overlay is effected by adding field values at the nodes of the respective fields.

6. A method according to claim 4, where at least one of the combining the displacement fields and the recalculation of the overlay is effected by composition of the respective fields.

7. A method according to claim 1, where g', the first derivative of g with respect to distance x from the origin on where the displacement d is defined is substantially zero at the boundary of the field.

8. A method according to claim 1, where g' is zero at the origin of −d.

9. A method according to claim 1, where g' is a continuous function.

10. A method according to claim 9, where g", the second derivative of g with respect to distance from the origin on where the displacement d is defined, is a continuous function.

11. A method according to claim 1, where the deformation obtained by applying the displacement field to an image is invertible.

12. A method according to claim 1, further including the step of defining R.

13. A method according to claim 12, where the function $x+\|d\|.g(x/R)$ has non-negative derivative with respect to distance from the origin of $-d$.

14. A method according to claim 13 where $X+\|d\|.g(x/R)$ is greater than $\alpha$, where $\alpha$ is an arbitrary strictly positive value between 0 and 1.

* * * * *